Figure 1:
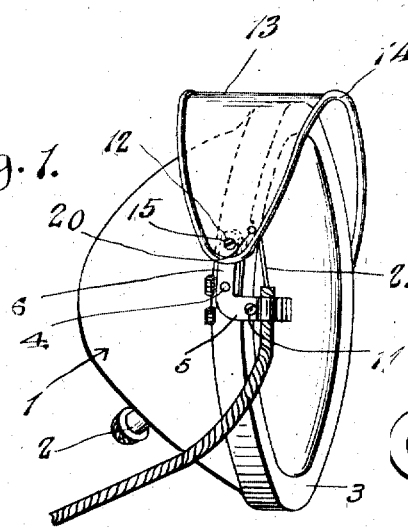

L. A. FEUCHTER.
HEADLIGHT DIMMER.
APPLICATION FILED SEPT. 8, 1916.

1,216,100.

Patented Feb. 13, 1917.

Witnesses
J. P. Wahlen
Jesse T. Dowling

Inventor
L. A. Feuchter
By A. Randolph Jr.
Attorney

UNITED STATES PATENT OFFICE.

LEO A. FEUCHTER, OF IRONTON, OHIO.

HEADLIGHT-DIMMER.

1,216,100.

Specification of Letters Patent.

Patented Feb. 13, 1917.

Application filed September 8, 1916. Serial No. 119,067.

*To all whom it may concern:*

Be it known that I, LEO A. FEUCHTER, a citizen of the United States, residing at Ironton, in the county of Lawrence and State of Ohio, have invented certain new and useful Improvements in Headlight-Dimmers; and I do hereby declare the following to be a full, clear, and exact description of the invention, such as will enable others skilled in the art to which it appertains to make and use the same.

This invention relates to improvements in attachments for headlights for dimming the same and has for its principal object to provide a device which will effectively shade a headlight without destroying the power of the light when most needed, in passing other vehicles and also give the driver of the car a well lighted roadway and at the same time protect the driver of other vehicles or pedestrians from the glare of the light.

A further object of the invention is to provide a device of this character which is made of suitable sheet material and which will effectively protect the eyes of persons approaching the vehicle upon which the device is used.

A still further object of this invention is to provide a headlight dimmer of this character which will be simple, practical and comparatively inexpensive in construction and one that can be manufactured and sold at a small cost and attached to any make or style of lamp.

With these and other objects in view, the invention consists in the novel combination and arrangement of parts hereinafter more fully described and set forth in the claims hereto appended.

Figure 3:
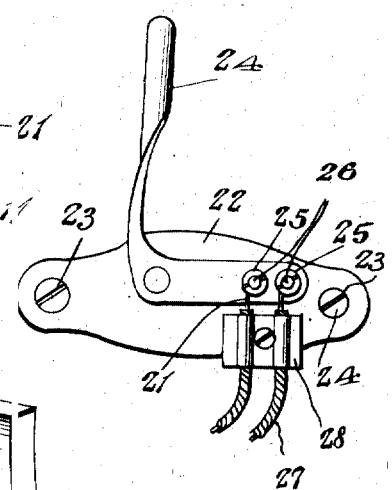
Figures 2, 4:
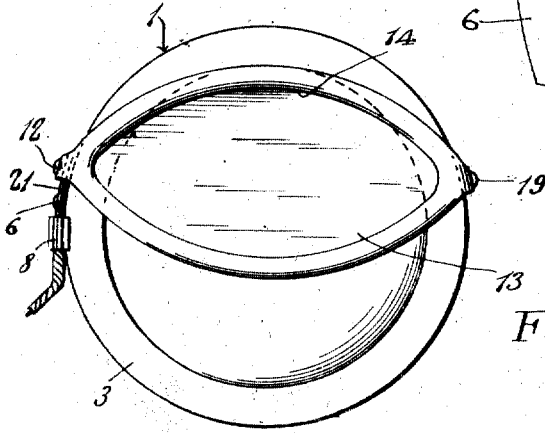
Figure 5:
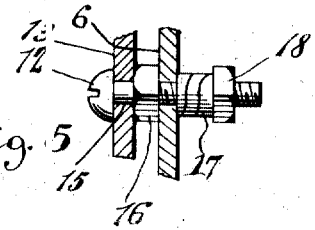

In the drawings:

Figure 1 is a perspective view of my improved attachment secured to a headlight and in an inoperative position, Fig. 2 is a front elevation of my attachment in an operative position, Fig. 3 is a front elevation of the operating lever and attaching plate, Fig. 4 is a perspective view of the bracket which supports the attachment to a headlight, and Fig. 5 is a detail view of my lock bolt for securing the shade or dimmer attachment to the headlight and preventing the rattling of the same, with parts in section.

Like numerals of reference designate like and corresponding parts in all the figures of the drawings.

Referring more particularly to the drawings, the numeral 1 designates as an entirety the headlight of any ordinary construction carrying the usual socket 2 by means of which the light is supported. Secured to the bead 3 by a suitable bolt or other fastening means 4 is the L-shaped supporting bracket 5.

The supporting bracket 5 is provided with a rectangular attaching portion 6 and has a right angularly extending arm at its lower edge which extends angularly therefrom and designated as at 7, the outer end of which is bifurcated as at 8 and is provided intermediate its ends with the circular enlargement 9, which forms the tube receiving socket 10, the purpose of which will be more fully hereinafter set forth. The attaching member 6 is provided near its upper edge and centrally of its side edges thereof with an opening 11, through which is adapted to extend a bolt 12, the purpose of which will be more fully hereinafter set forth. The supporting bracket 6 is adapted to support one end of the shield 13 and its opposite end is pivotally secured to the bead 3 of the lamp.

The shield 13 hereinbefore referred to, is designated by the numeral 13 and comprises an oblong body portion 14 having each of its ends provided with apertures 15. The bolt 12 extends through the aperture 15 of the shield 13 and interposed between the head of the bolt and the shield is a spacing nut or washer 16. The opposite end of the bolt extends through the bracket member 6 and is provided with a spring lock washer 17 and a nut 18, which holds the shield 13 against rattling and loose movement when assembled.

The opposite end of the shield member is provided with a screw threaded stud 19, which is adapted to engage the bead 3 at diametrically opposite points from the bolt 12 which permits pivotal movement of the shield member to be drawn down over a portion of the lamp 1.

The shield member is provided near one end with an elongated or an oblong shaped opening 20 in which is secured one end of adjustable connection or operating wire 21 the purpose of which will be hereinafter more fully set forth.

An oblong attaching plate 22 provided near each end with openings 23 through which are adapted to extend fastening means 24 such as screws or the like for securing the same to the steering wheel or the side of a car near the operator. Pivoted to the front face of the plate 22 is an L-shaped lever 24 which is provided near its outer end with a pair of openings 25 which are adapted to receive set screws 26 to which are secured the free ends of the operating wires 21. The operating wires are protected by flexible tubing 27 which has one of their ends supported in a block 28, which block is carried by the plate 22. The opposite ends of the flexible tubes extend from the plate 22 to and through the opening 10 of the arm 7 of the plate 6 thereby protecting the wires 21 against being deranged or accidentally broken.

In the operation of my improved headlight dimmer, the lever 24 is moved rearwardly and the wires 21 drawn rearwardly thereby moving the dimmer downward over the head light upon its pivot bolts 15 and 19, when it is desired to lift the dimmer, the lever 24 is forced forwardly moving the shield 13 upwardly to its normal position.

What is claimed is:

1. The combination with a headlight, a bracket fixed against movement on one side of the headlight, a shield pivoted at one end to the bracket and its opposite end to the headlight, and a flexible operating means supported by the bracket and attached to the shield for moving the same into an operative or inoperative position.

2. The combination with a headlight, a bracket supported at one side of the headlight, a shield pivotally secured to the bracket and headlight, a clamp at the forward end of the bracket, a flexible tube carried by the clamp, and operating means extending through the flexible tube and connected to the shield for moving the same into operative or inoperative position.

3. The combination with a headlight, a bracket supported by the headlight, a shield pivotally secured at one end to the headlight and its opposite end to the bracket, a clamp at the forward end of the bracket, a flexible tube carried by the clamp, an operating wire having one end connected to the shield and its opposite end having means for moving the shield into operative or inoperative position.

4. The combination with a headlight, an L-shaped bracket rigidly secured to one side of the headlight, a shield pivotally secured to one arm of the bracket and its opposite end to the headlight, a clamp at the forward end of the free arm of the bracket, a flexible tube having one end supported by the clamp, an attaching plate, a lever pivotally secured to the attaching plate, a clamp block carried by the plate, the free end of the tube being supported by the clamp block, and an operating wire having one end connected to the shield and extending through the tube and having its free end secured to the lever for moving the shield into operative or inoperative position.

5. The combination with a headlight, an L-shaped bracket supported by the headlight, a shield pivotally secured at one end to the bracket and its opposite end to the headlight, at diametrically opposite points, from its connection with the bracket, a clamp at the forward end of the bracket, an attaching plate, a lever pivotally secured to the attaching plate, a clamp block carried by the attaching plate, a flexible tube having one end secured to the clamp block, and its opposite end secured to the forward end of the bracket, a wire having one end connected to the shield and extending through the flexible tube and secured to the lever whereby upon movement of the lever the shield will be moved into operative or inoperative position.

In testimony whereof I affix my signature in presence of two witnesses.

LEO A. FEUCHTER.

Witnesses:
J. O. YATES,
JAMES HAMILTON.